Nov. 9, 1954 C. A. HUGGINS 2,693,949
APPARATUS FOR CONTACTING GASES AND LIQUIDS
Filed Oct. 19, 1950 2 Sheets-Sheet 1
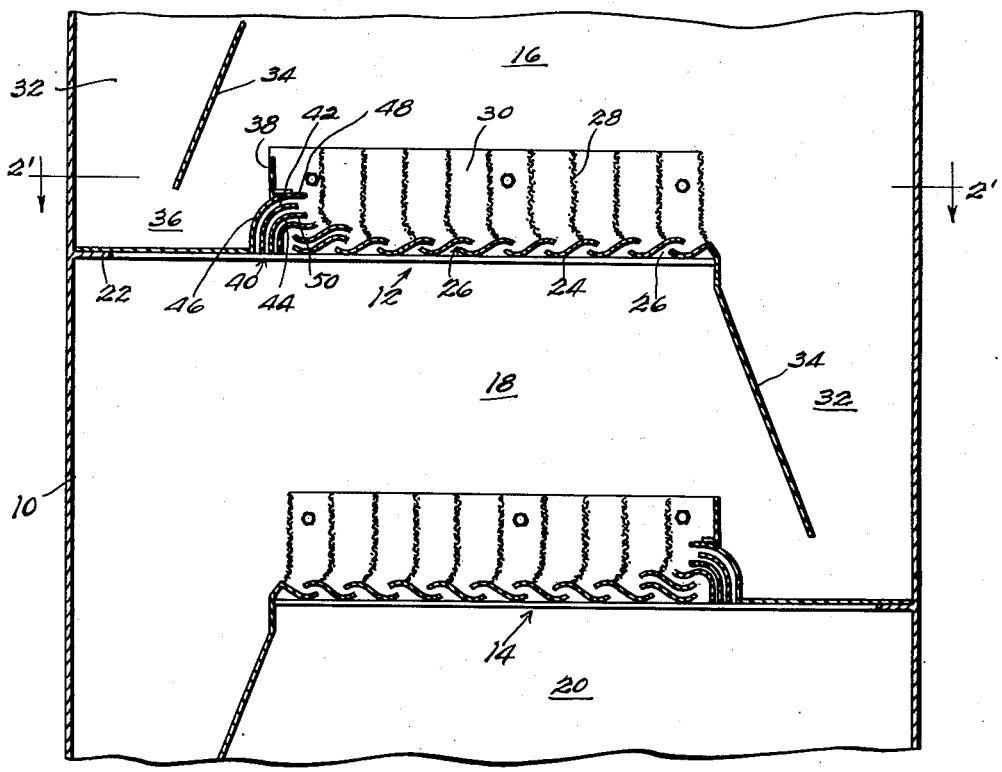
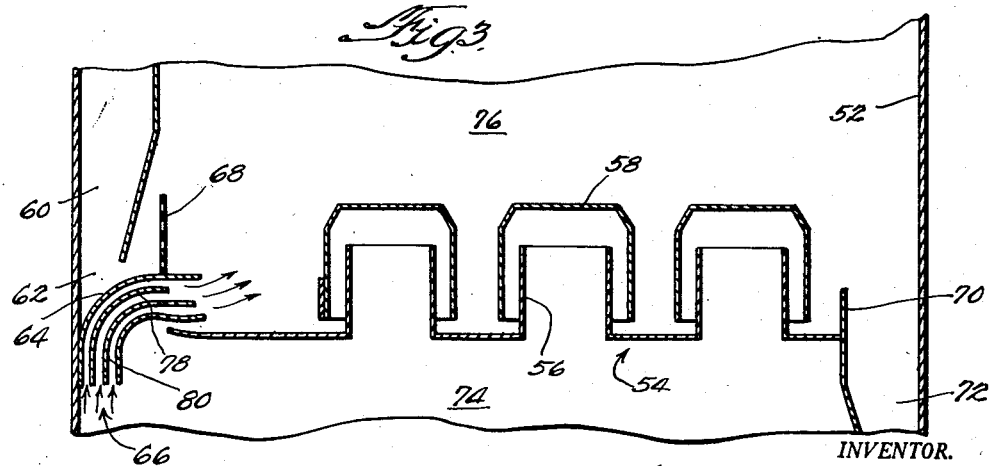
INVENTOR.
Clifford Andrew Huggins.

Nov. 9, 1954 C. A. HUGGINS 2,693,949
APPARATUS FOR CONTACTING GASES AND LIQUIDS
Filed Oct. 19, 1950 2 Sheets-Sheet 2
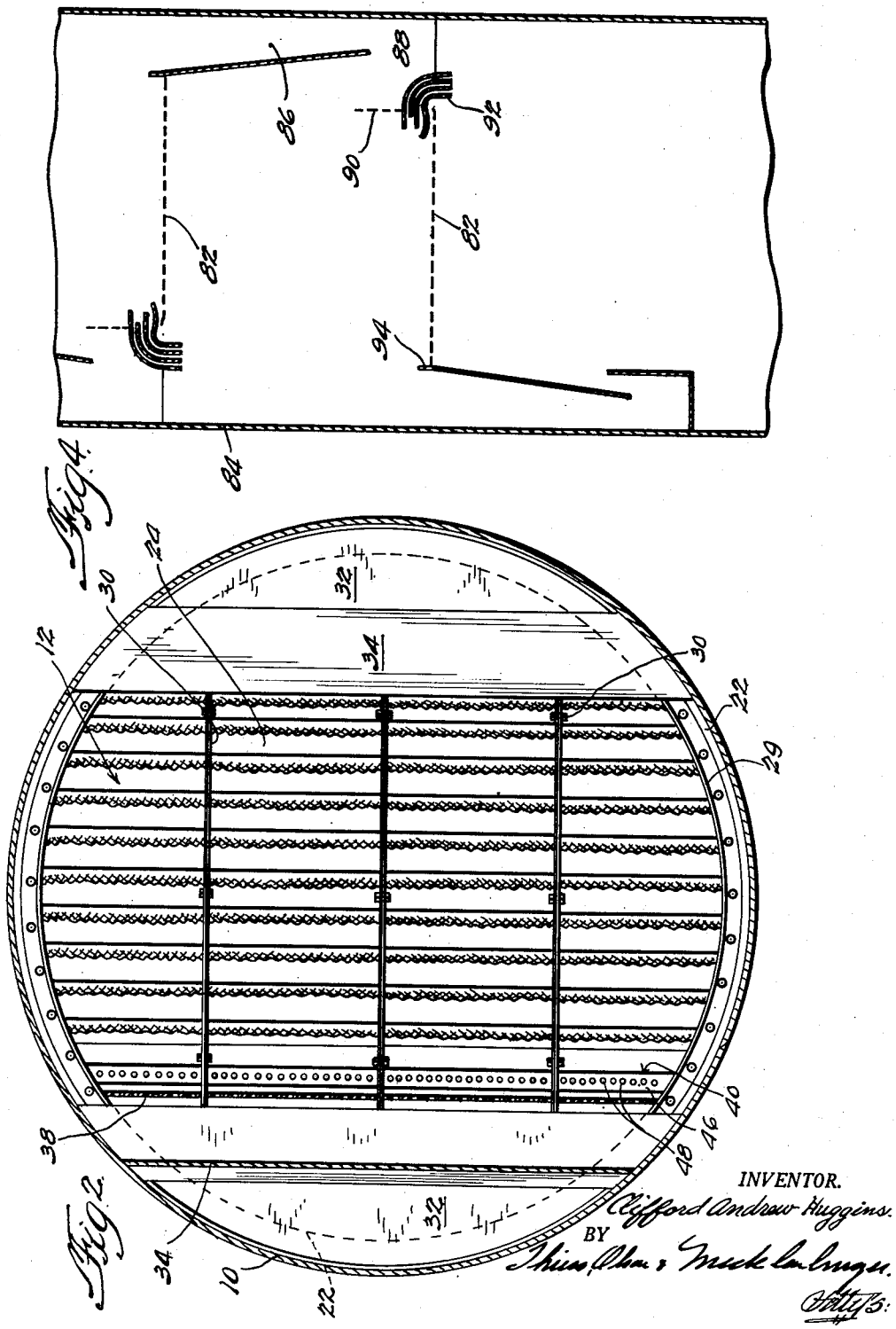
INVENTOR.
Clifford Andrew Huggins.
BY

United States Patent Office 2,693,949
Patented Nov. 9, 1954

2,693,949
APPARATUS FOR CONTACTING GASES AND LIQUIDS

Clifford Andrew Huggins, Wichita, Kans., assignor to Koch Engineering Company, Inc., Wichita, Kans., a corporation of Kansas Application October 19, 1950, Serial No. 190,973

6 Claims. (Cl. 261—114)

This invention relates to an apparatus for contacting gases and liquids. More particularly, this invention relates to a gas-liquid contact apparatus suitable for use in the art of distillation or fractionation.

In the art of dephlegmation, fractionation or distillation, it is necessary that liquids and gases be thoroughly mixed in order to obtain the desired efficiency, and the intimacy with which the two phases are mixed determines in a large measure the effectiveness of the fractionation. In carrying out distillations or fractionations, it is important that the intermingling of the vapors and liquids be effected easily so that a wide latitude will be permitted in the amount of liquids and vapors that may be passed to and from the equipment. This invention finds particular application in the oil refining art where fractionation or dephlegmation is carried on on a large scale in order to separate the various hydrocarbon fractions.

Accordingly it is an object of this invention to provide an apparatus for contacting liquids and gases in which a thorough mixing of the components is attained.

A further object of this invention is the provision of an apparatus for contacting liquids and gases which comprehends a contact chamber having a plurality of trays substantially horizontally disposed therein for intimately contacting vapors and liquids.

A still further object of this invention is the provision of an apparatus in which the build-up of a liquid gradient on each successive tray of the device is reduced or eliminated.

A still further object of this invention is the provision of an improved apparatus in which the pressure drop across several trays therein has been reduced to a minimum.

A still further object of this invention is the provision of an apparatus for contacting liquids and gases in which the several trays within the contact chamber have been stabilized to an effective degree.

A still further object of this invention is the provision of a gas-liquid contacting system in which all of the elements of each tray in teh contacting apparatus are utilized at equally high efficiencies.

A further and additional object of this invention is the provision of an apparatus for contacting gases and liquids in which unusually large quantities of liquids can be handled without substantial loss in vapor handling capacity.

A still further object of this invention is the provision of an improvement in fractionation or dephlegmation apparatuses which improvement may be adapted to several types of fractionating equipment now in general use.

Further and additional objects will appear from the following description, the accompanying drawings and the appended claims.

In accordance with one embodiment of this invention, an apparatus has been devised which contemplates a suitable contacting chamber such as a fractionating tower having a plurality of substantially horizontally arranged spaced trays therein including means for passing liquid downwardly from tray to tray and means for passing vapors upwardly through the trays and also having means for imparting a horizontal thrust to a liquid flowing over the surface of each tray whereby the build-up of liquid on one portion of the tray is prevented. In accordance with this invention, the thrust is provided by injecting a substantial stream of vapors or gases in a substantially horizontal direction across the surface of the tray in the direction of the flow of the liquid across the tray. Thus as liquid is flowed onto the tray it is subjected to a substantial stream of horizontally moving gases or vapors which tends to thrust the liquid in a horizontal direction toward the discharge end of the tray, thereby permitting rapid and efficient contact of the liquid with gases or vapors that are simultaneously passing up through the tray. Preferably the horizontal stream of vapors originates from a vapor zone in the tower immediately below the tray over which they are transversely passed in a horizontal direction. As will be apparent from the following description, this invention finds usefulness in contact towers containing the usual horizontally disposed contact trays, such as bubble trays or perforated trays.

For a more complete understanding of this invention, reference will now be had to the accompanying drawings, wherein Fig. 1 is a partial vertical sectional view of a portion of a contact tower constructed in accordance with one embodiment of this invention;

Fig. 2 is a sectional view of the device shown in Fig. 1 and taken along the line 2'—2' thereof;

Fig. 3 is a sectional detail view of a modified form of tray constructed in accordance with another embodiment of this invention; and Fig. 4 is another vertical sectional view of a contact tower constructed in accordance with still another embodiment of this invention.

With particular reference to Fig. 1, there is provided a contact chamber or tower 10 of the usual cylindrical construction. Means (not shown) are provided for introducing vapor to be fractionated into a bottom portion of a tower and means (also not shown) are provided for removing separated vapors and liquid constituents therefrom and adding reflux thereto as will be readily apparent to one skilled in the art. Within the tower 10 are located a plurality of horizontally extending and vertically spaced trays 12 and 14, each of which extends substantially entirely across the tower serving to divide it into a plurality of vapor zones 16, 18 and 20. In the modification shown in Figs. 1 and 2 the tray 12 (for example) is supported on an annular flange 22 which is welded or otherwise secured to the side walls of the tray in a plurality of separate sections, four being shown in Fig. 2. The main body portion of the tray 12 comprises a plurality of elongated baffle elements 24 which may be fastened at their ends to support plates 29 and 30 by welding or bolting. As will be apparent from Fig. 2, the center sections are bounded at their ends with flat support plates 30 and the latter include means for securing the several sections together to form the desired tray. The outer ends of the outer sections include curved support plates 29 which conform to the side wall of the tower and serve as means for securing the tray to the annular flange 22. The baffle elements 24 in the modification shown in Fig. 1 are arranged in spaced overlapping relationship and have a transverse cross section which is in the shape of a flattened S although other shapes and forms will readily suggest themselves. The baffle elements are spaced from each other to provide elongated vapor or gas passageways 26 through the tray. Each of the baffle plates 24 has attached to the upper surfaces thereof an elongated foraminous plate or screen 28. These elongated plates extend in a generally vertical direction for substantially the entire width of each tray section. They may also be secured to the respective end plates 29 and 30.

Means is provided for discharging a liquid onto the upper surface of each tray. This means comprises a downpour 32 formed between the side walls of the tower 10 and a piece of sheet material 34 depending from the tray immediately above which may be bent at its upper end in such a manner that the upper end constitutes one of the baffle plates 24. Beneath the downpour 32 the tray 12 is formed to provide a seal pan 36 which includes a perforated weir member 38. Thus it will be apparent that any liquid flowing through the downpour will collect in the sealing chamber 36 until such time as the liquid therein extends somewhat above the lower edge of the plate 34 whereafter the liquid is discharged from the seal pan through the perforations in the weir member 38 and onto the tray by overflowing the weir. However, as will may be eliminated if desired and the liquid is then passed onto the tray be overflowing the weir. However, as will be apparent from the description to follow, it is preferred that the weir member 38 be perforated in order to achieve a preliminary break-up of the liquid passed therethrough.

In the operation of the apparatus as thus far described, vapors are continuously passed from a lower portion of the device to an upper portion of the device through the successive zones 20, 18 and 16. In each instance the vapors pass upwardly through the passageways 26 formed between the baffle elements 24. The vapors cannot pass up through the several downpours 32 because of the sealing effected by the sealing pans 36. Thus in vigorous distillations or fractionations vapor may be passed at a considerable velocity upwardly through the openings 26. At the same time liquid is discharged from a zone above onto the tray through the downpour 32 and flows toward the baffle elements 24 from the weir 38. The liquid passes over the tray and is discharged into the next lower downpour for passage over another lower tray of similar construction.

In accordance with this invention and in order to assist the travel of the liquid over the tray and through the several screens 28, as to be described, there is provided means for imparting a horizontal thrust to the liquid introduced onto the tray over or through the weir 38. This thrust-imparting means comprises a conduit or duct 40 which communicates between zones 18 and 16. This conduit or duct 40 is elongated and has an open discharge mouth which extends for substantially the entire length of the weir 38. Preferably the duct 40 includes a pair of spaced baffle elements 42 and 44 which serve to direct the vapors passed through the duct in the desired horizontal direction. If desired, the upper end edge of the plate 46 defining the duct 40 may be provided with a plurality of perforations 48 which function to break up the flow of liquid coming down over or through the weir 38. Similarly the baffle plate 44 may also be provided with a row of perforations 50 if so desired.

Thus it will be seen that the conduit or duct 40 communicates with a lower zone 18 and is capable of discharging through its elongated mouth a blanket stream of vapors transversely of the tray 12 in a direction of the normal movement of the liquid over the tray. Thus the vapors serve to boost the liquid across the tray, thus preventing a substantial build-up of liquid at that end or side which receives the liquid. In the operation of each tray liquid is passed over the weir 38 and thrust by means of the vapors coming through the duct 40 in a horizontal direction where it impinges against the first foraminous plate or screen 28. The vapors continue their passage through the screen while a substantial proportion of the liquid gravitates down the screen on the side thereof adjacent the next screen. The liquid flows onto a baffle plate 24 and is picked up and thrown against the next screen by vapors passing through the adjacent passageway 26. A horizontal thrust is also imparted by vapors from the duct 40. This action is repeated until the liquid is discharged from the other end of the tray.

Thus the horizontally moving blanket of vapors passing over the tray prevents the pile-up of liquid adjacent the receiving end of the tray. This permits a more efficient operation since the tray has become stabilized. It will, of course, be apparent that the relative sizes and proportions can be widely varied depending on conditions of operation.

A further embodiment of this invention is shown in Fig. 3 wherein the herein defined improvement has been applied to a contact tower of the usual bubble tray type. In this form of the device the tower 52 has contained therein a plurality of bubble trays 54 of the usual type including a plurality of spaced upwardly extending open conduits 56 capped by the usual bubble caps 58 which may be provided with suitable slits (not shown). Liquid is fed to the bubble tray through a downpour 60 at the bottom of which is a sealing pan 62 defined by a side wall baffle element 64 and a perforated weir member 68. Liquid is discharged from the bubble tray 54 on an opposite side of the tray over a weir member 70 which is merely an extension of the sheet which cooperates with the side walls of the tower to form the next downpour 72.

In accordance with this invention, as shown in Fig. 3, an elongated conduit or duct 66 is provided extending for a substantial distance across the tower 52 and communicating between a lower zone 74 and an upper zone 76 which is defined by the bubble tray 54. Preferably the duct is elongated to provide an open mouth of substantial dimension for discharging vapor or gas in a horizontal direction. Suitable directing baffles 78 and 80 may also be provided within the duct 66 to more positively direct the gases flowing therefrom in a horizontal direction over the surface of the tray 54. Usually it is preferred to block the slits or notches (not shown) in the row of bubble caps next adjacent the duct 66 to prevent the gases or vapors being emitted therefrom from flowing back through the bubble cap thereby hindering the flow of liquid across the plate. It is believed that the operation of this modification will be apparent from the above description. Briefly, the liquid enters the tray through the downpour 60 and over or through the weir 68. At this point the liquid is contacted with the vapors passing rapidly through the duct 66 whereby the liquid is thrust across the tray, whereby the tendency of the liquid to form a gradient on the tray is counteracted or eliminated. A major portion of the vapors, in accordance with the usual practice, passes from zone 74 to zone 76 through the bubble caps 58.

With reference to Fig. 4, the device is there shown in connection with perforated tray members 82 which also extend substantially across the interior of a tower 84 as will be apparent to one skilled in the art. In the operation of this device liquid is passed through downpours 86 into sealing chambers 88 and through or over weirs 90 onto the plates 82. Liquid is flowed across the plates 82 assisted by the stream of vapors passed horizontally over the surface thereof from the duct 92. Gases passing at relatively high velocity upwardly through the perforations in the plate 82 prevent liquid from dropping therethrough and therefore the liquid is normally discharged from the plate 82 over a weir 94 and discharged into the next succeeding downpour. It will be apparent in this form of the device that the supplemental stream of gases or vapors passed through the duct 92 prevents the build-up or accumulation of liquid adjacent that portion of the tray which receives the liquid from a previous tray.

Thus it will be apparent that the process of this invention results in a lowering of the effective density of a liquid at the point where the liquid enters the tray thereby permitting more vigorous action between the liquid and vapors at that point. This results in a more stable tray since the rate of flow of vapors through the tray has been substantially equalized and all elements of each tray are thus utilized equally. By providing the vigorous action adjacent the upper surface of each tray, there is provided more intimate contact between liquid and vapors and the pressure drop across each tray is materially reduced. This permits of the device handling unusually large quantities of liquid with substantially no less in vapor handling capacity. By this invention the vapors and liquids are forcefully contacted and there is no opportunity for gas-liquid by-passing within the system. This results in a more efficient fractionation on that particular tray.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A gas-liquid contact apparatus comprising a contact chamber, a tray having gas passing openings therein extending transversely across said chamber dividing it into an upper contact zone and a lower zone, a first downpour in said upper zone including a horizontally extending weir member for flowing liquid over said tray at one location, a second downpour transversely spaced from the first downpour and extending below said tray for receiving liquid from above said tray and for discharging it to said lower zone, and a gas stream discharge conduit having an elongated mouth extending parallel to and below said weir member for a substantial distance across said tray, said conduit being arranged to project a flat blanket of gas transversely across the upper surface of said tray toward said second downpour, said gas-passing openings being spaced vertically below said weir member and arranged to prevent substantial liquid accumulation on said tray and whereby gases passing upwardly through said openings in said tray at a relatively high velocity prevent appreciable flow of liquid downwardly therethrough, and said mouth being spaced vertically above the gas passing openings in said tray whereby liquid flowing from said first downpour is discharged over said weir onto the upper surface of said blanket of gas adjacent said mouth and then across said tray to said second downpour.

2. The gas-liquid contact apparatus recited in claim 1 wherein said gas stream discharge conduit communicates with said lower zone and wherein said elongated mouth extends substantially entirely across said tray coextensive with said weir member.

3. A gas-liquid contact apparatus comprising a contact chamber, a tray extending transversely across said chamber dividing it into an upper contact zone and a lower contact zone, a first downpour in said upper zone including a horizontally extending weir member for flowing liquid over said tray at one location, a second downpour transversely spaced from the first downpour and extending below said tray for receiving liquid from above said tray and for discharging it to said lower zone, said tray including a plurality of spaced, overlapping baffle elements having their longitudinal axes substantially parallel to said weir member providing elongated transverse openings spaced vertically below said weir member for passing gases upwardly through said tray, and a gas stream discharge conduit having an elongated mouth extending parallel to and below said weir member but above said openings for a substantial distance across said tray, said conduit being arranged to project a flat blanket of gas transversely across the upper surface of said tray and said baffle elements toward said second downpour whereby liquid flowing from said first downpour is discharged over said weir onto the upper surface of said blanket of gas adjacent said mouth.

4. The gas-liquid contact apparatus recited in claim 3 wherein said spaced baffle elements overlap in the direction of movement of said blanket between said first and second downpours whereby gases passing upwardly through said elongated openings have a horizontal component of movement toward said second downpour.

5. The gas-liquid contact apparatus recited in claim 4 including a plurality of foraminous foam-breaking webs extending upwardly above said tray in the path of movement of said blanket across said tray.

6. A gas-liquid contact apparatus comprising a contact chamber, a tray extending transversely across said chamber dividing it into an upper contact zone and a lower contact zone, a first downpour in said upper zone including a horizontally extending weir member for flowing liquid over said tray at one location, a second downpour transversely spaced from the first downpour and extending below said tray for receiving liquid from above said tray and for discharging it to said lower zone, said tray including a plurality of spaced, overlapping baffle elements having their longitudinal axes substantially parallel to said weir member providing elongated transverse openings spaced vertically below said weir member for passing gases upwardly through said tray, and a gas stream discharge means adjacent said weir member and vertically spaced below said weir member but above said openings for projecting a flat blanket of gas transversely across the upper surface of said tray and said baffle elements from adjacent said first downpour toward said second downpour whereby liquid flowing from said first downpour is discharged over said weir onto the upper surface of said blanket of gas.

References Cited in the file of this patent

UNITED STATES PATENTS

| Number | Name | Date |
|---|---|---|
| 764,049 | Guldlin | July 5, 1904 |
| 1,782,735 | MacKenzie | Nov. 25, 1930 |
| 1,935,709 | Hall | Nov. 21, 1933 |
| 2,091,349 | Bergman | Aug. 31, 1937 |
| 2,116,933 | Ragatz | May 10, 1938 |
| 2,120,256 | Mensing | June 14, 1938 |
| 2,338,446 | Lambert | Jan. 4, 1944 |
| 2,510,590 | Kraft | June 6, 1950 |
| 2,591,343 | Eld | Apr. 1, 1952 |